(12) United States Patent
Goldasz et al.

(10) Patent No.: US 9,182,005 B2
(45) Date of Patent: Nov. 10, 2015

(54) HYDRAULIC SUSPENSION DAMPER WITH A FLOATING DISC VALVE

(75) Inventors: Janusz Goldasz, Krakow (PL);
Zbigniew Szklarz, Zator (PL);
Waldemar Widla, Zabierzow (PL)

(73) Assignee: BeijingWest Industries, Co. Ltd., Beijing (CN)

( * ) Notice: Subject to any disclaimer, the term of this patent is extended or adjusted under 35 U.S.C. 154(b) by 0 days.

(21) Appl. No.: 14/236,543

(22) PCT Filed: Apr. 23, 2012

(86) PCT No.: PCT/CN2012/074538
§ 371 (c)(1),
(2), (4) Date: Jan. 31, 2014

(87) PCT Pub. No.: WO2013/159276
PCT Pub. Date: Oct. 31, 2013

(65) Prior Publication Data
US 2015/0041264 A1    Feb. 12, 2015

(51) Int. Cl.
*F16F 9/348*    (2006.01)

(52) U.S. Cl.
CPC .............. *F16F 9/348* (2013.01); *F16F 9/3484* (2013.01)

(58) Field of Classification Search
CPC ....... F16F 9/348; F16F 9/3484; F16F 9/3405; F16F 9/3482; F16F 9/3485
USPC .............................. 188/313, 316–320, 322.15
See application file for complete search history.

(56) References Cited

U.S. PATENT DOCUMENTS

| | | | |
|---|---|---|---|
| 3,747,714 A | 7/1973 | DeCarbon | |
| 3,845,782 A * | 11/1974 | Nicholls et al. | ........... 137/493 |
| 4,972,929 A * | 11/1990 | Ivers et al. | ........... 188/322.15 |
| 5,042,624 A | 8/1991 | Furuya et al. | |
| 5,332,069 A | 7/1994 | Murakami | |
| 5,413,195 A | 5/1995 | Murakami | |
| 6,089,142 A | 7/2000 | Adrian et al. | |
| 6,318,523 B1 * | 11/2001 | Moradmand et al. | ........ 188/280 |
| 6,464,053 B1 | 10/2002 | Hoebrechts | |

(Continued)

FOREIGN PATENT DOCUMENTS

| CN | 101796323 A | 8/2010 |
|---|---|---|
| DE | 969330 C | 5/1958 |

(Continued)

OTHER PUBLICATIONS

International Search Report, Jan. 31, 2013, 4 pages.

*Primary Examiner* — Vishal Sahni
(74) *Attorney, Agent, or Firm* — Dickinson Wright PLLC

(57) ABSTRACT

A hydraulic damper (2) comprises a tube (3) filled with working liquid, inside of which a slidable piston assembly (4) is attached to a piston rod (6) and provided with at least one valve assembly (43) to control the flow of working liquid passing through the piston assembly (4) during rebound and compression stroke of the damper. The valve assembly (4) contains a floating disc valve (431) and additionally comprises a unidirectional check valve disc (436) disposed serially with the floating disc valve (431) across the passage of the flow of working liquid during compression or rebound stroke of the damper (2). Preferably the piston assembly (4) forms a symmetrical cross-flow arrangement and preferably the at least one valve assembly includes compression (43*a*) and rebound (43*b*) valve assemblies of the piston assembly (4) which each have the same constructions.

6 Claims, 4 Drawing Sheets

(56) References Cited

U.S. PATENT DOCUMENTS

| | | | | |
|---|---|---|---|---|
| 6,644,445 B2 * | 11/2003 | Dodge | ................... | 188/282.6 |
| 7,694,786 B2 * | 4/2010 | Asadi et al. | ............... | 188/322.15 |
| 8,042,661 B2 * | 10/2011 | Ota et al. | ................. | 188/322.15 |
| 8,997,953 B2 | 4/2015 | Deferme | | |
| 2006/0283676 A1 | 12/2006 | Deferme | | |
| 2009/0000891 A1 | 1/2009 | Kouyama et al. | | |

FOREIGN PATENT DOCUMENTS

| | | |
|---|---|---|
| FR | 2883611 A1 | 9/2006 |
| WO | 2006100406 A1 | 9/2006 |

* cited by examiner

HYDRAULIC SUSPENSION DAMPER WITH A FLOATING DISC VALVE

CROSS REFERENCE TO RELATED APPLICATION

This application claims the benefit of PCT International Application Serial No. PCT/CN2012/074538 filed on Apr. 23, 2013, and entitled "A Hydraulic Suspension Damper With a Floating Disc".

The present invention relates to a hydraulic damper, in particular a motor vehicle suspension damper, comprising at least one tube filled with working liquid, inside of which a slidable piston assembly attached to a piston rod led outside the damper through a sealed rod guide and provided with at least one valve assembly to control the flow of working liquid passing through the piston assembly during rebound and compression stroke of the damper, is disposed dividing the tube into a compression chamber and a rebound chamber, wherein the piston rod passes through the piston assembly and a fastener secures the piston assembly at the other side, and wherein said valve assembly contains a floating disc valve.

Patent specification U.S. Pat. No. 3,747,714 discloses a shock absorber piston provided with series of permanently open passageways in the form of longitudinal grooves in the periphery of the piston. These controlled passageways are governed by a floating disc valve mounted against a circular ridge on one surface of the piston and adapted to flex under the influence of compression and rebound movements of the piston to control flow of damping fluid around both edges of the annular valve disc.

Though a damper of this kind features a simple construction, tuning thereof i.e. adjustment of the floating disc valve parameters to provide required damping force with regard to the velocity of the piston rod needs to be performed simultaneously for the compression and for the rebound stroke of the damper. In other words these valve parameters are conjugated so that optimal parameters during the compression stroke may not be optimal for the rebound stroke and vice versa.

Patent specification U.S. Pat. No. 6,464,053 discloses a piston assembly in which compression and rebound passages are generally S-shaped with their inlets being disposed radially outward from their outlets, so that rebound and compression check valves can be designed to only extend radially to cover the outlets and not affect the inlets and therefore rebound and compression check valves can be the same, which reduces the number of different parts required for piston assembly.

Patent specification FR 2883611 discloses a piston assembly having a cylindrical body traversed by the channels, and identical connected covers applied to the body, each defining a chamber between the cover and the body and forming an annular valve seat at the other side on which bladed valve is supported. A similar solution is disclosed in the publication WO 2006/100406.

It has been the object of the present invention to provide a damper featuring a simple and economical construction with only a few different yet typical, if only possible, elements that would be easy to tune independently for a rebound and compression stroke of the damper and would guarantee repeatability of operation independently on the conditions of the fastener securing the piston assembly to the piston rod.

In order to accomplish the aforementioned and other objects, in a damper of the kind mentioned in the outset, according to the present invention at least one valve assembly additionally comprises a unidirectional check valve disc disposed serially with the floating disc valve across the passage of the flow of working liquid during compression or rebound stroke of the damper.

Such a construction enables independent tuning of the floating disc valve parameters for a given (compression or rebound) stroke of the damper. Moreover due to the clamping-free design thereof, it is independent on geometric preload features of the piston assembly, such as a torque of the nut securing the piston assembly to the piston rod; and since tolerance requirements for the elements forming the valve assembly are lower, self-cleaning properties of the piston assembly are achieved.

Preferably both compression and rebound valve assemblies of the piston assembly comprise unidirectional check valve discs disposed serially with the floating disc valves across the passages of the flow of working liquid respectively during compression and rebound stroke of the damper.

Thanks to that, independent tuning of the floating disc valve parameters is possible both for a compression and for rebound stroke of the damper.

n such a construction it is advantageous if the piston assembly forms a symmetrical cross-flow arrangement.

Preferred cross-flow arrangement can be obtained with the piston assembly comprising a body provided with at least two channels separated by bridges and two inserts, each provided with at least one inner opening and at least one outer opening, wherein the inserts are fixedly positioned angularly within the body in relation to each other and to the channels, so that each inner opening of an insert cooperates with a channel and one outer opening of an insert at the other side of the body.

In such a case preferably inserts form valve seats for the rebound and compression valve assemblies.

Preferably said compression and rebound valve assemblies of the piston assembly have the same constructions.

Thanks to that the number of distinct piston assembly parts is reduced.

The exemplary embodiments of the present invention are presented below in connection with the attached drawings on which:

FIG. 1 schematically illustrates a front right motor vehicle suspension;

Figure 1:
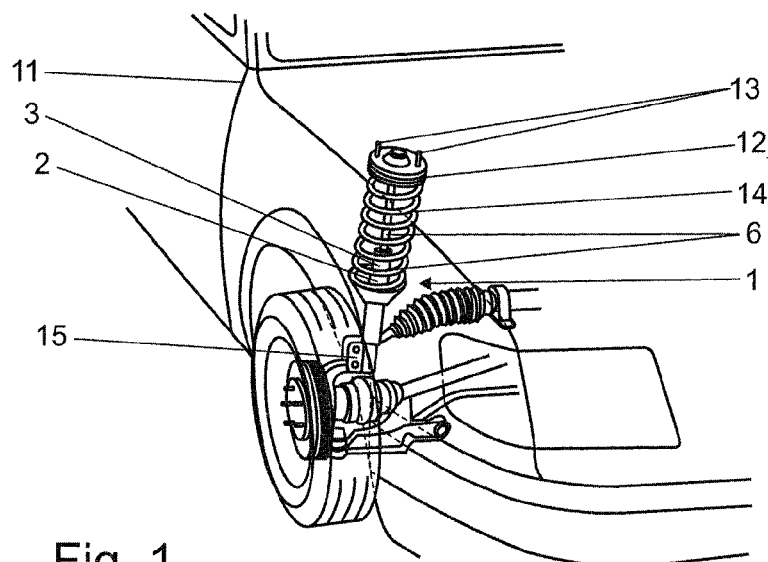

FIG. 1 schematically illustrates a fragment of an exemplary vehicle suspension 1 attached to a vehicle chassis 11 by means of a top mount 12 and a number of screws 13 disposed on the periphery of the upper surface of the top mount 12. The top mount 12 is connected to a coil spring 14 and a rod 6 of a mono- or twin-tube hydraulic damper 2. The tube 3 of the damper 2 is filled with working liquid inside of which a piston assembly attached to the rod 6 led outside the tube 3 is slidably disposed. At the other end the damper 2 tube 3 is connected to the steering knuckle 15 supporting the vehicle wheel.

Figure 2:
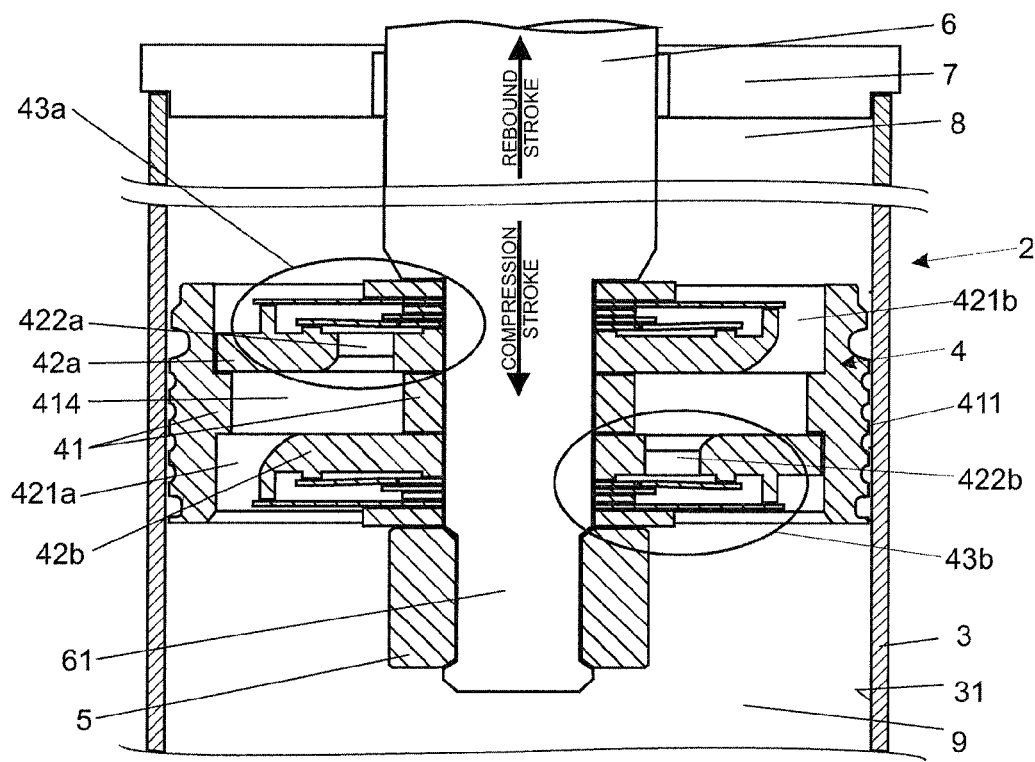
FIG. 2 is a schematic cross-sectional view of a fragment of a hydraulic damper according to the present invention.

A hydraulic damper 2 shown in part in FIG. 2 is an example of either a mono- or twin-tube damper that may be employed in a vehicle suspension 1 presented in FIG. 1. It comprises a tube 3 filled with working liquid, inside of which a movable piston assembly 4 is slidably disposed making a sliding fit with the inner surface 31 of the tube 3 and dividing the tube 3 into a rebound chamber 8 and a compression chamber 9. At one end the piston rod 6 passes through and secures the piston assembly 4 by means of a fastener 5 in a form of a threaded nut. The other end of the piston rod 6 is led axially outside the damper 2 through a sealed rod guide 7. The tube 3 is closed by a valve assembly (not shown) in case the damper 2 is a twin-tube damper or by floating gas cup assembly (not shown) for pressure compensation in case the damper 2 is a mono-tube damper.

The piston assembly 4 comprises a cylindrical body 41 and two inserts 42 manufactured from a powdered metal process forming a piston assembly core with annular valve seats for the rebound and compression valve assemblies 43 that control the flow of working liquid passing through the piston assembly 4 core during the rebound and the compression stroke of the damper 2. The body 41 is provided with an outer annular seal 411 of Teflon material or one of similar properties, which makes a sealing sliding fit with the inner surface 31 of the tube 3.

Figure 3:
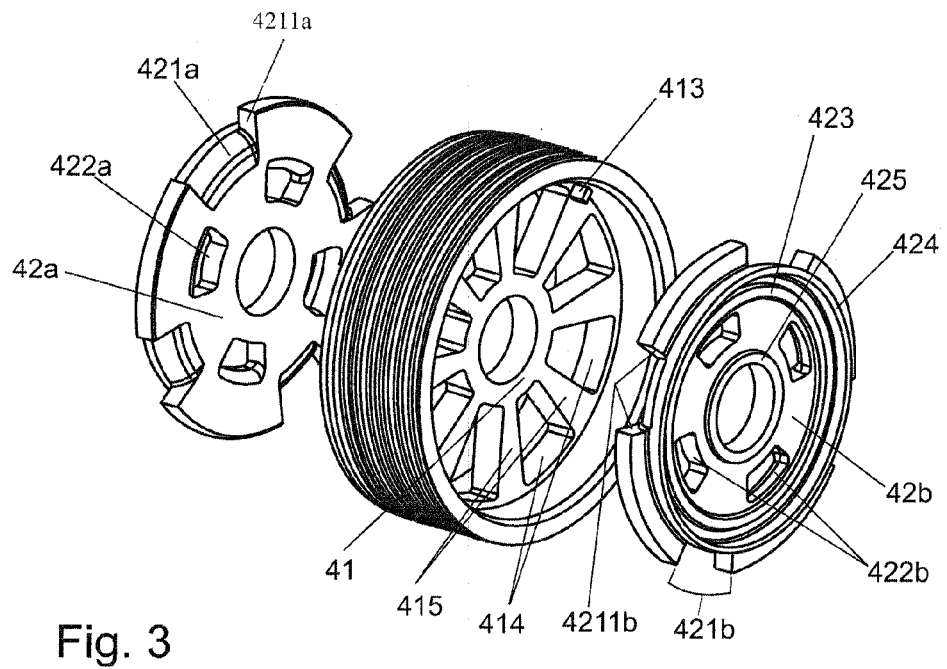
FIG. 3 is an enlarged exploded perspective view of a part of a piston assembly of the damper shown in FIG. 2.

As shown in FIG. 3, the body 41 is provided with eight circular sector channels 414 spaced equiangularly and separated by bridges 415. When the piston assembly 4 is assembled, the inserts 42 are tightly pressed to the body 41 in a predefined angular position, so that each outer opening 421a of an insert 42a cooperates exactly with one channel 414 and one inner opening 422b of an insert 42b at the other side of the body 41, as well as each outer opening 421b of an insert 42b cooperates exactly with one channel 414 and one inner opening 422a of an insert 42a at the other side of the body 41 (cf. FIG. 2).

Thus the piston body 41 and the inserts 42 form a symmetrical cross-flow arrangement. In order to form such an arrangement the inserts 42a, 42b are fixedly positioned angularly within the body 41 in relation to each other and to the channels 414 of the body 41. Fixed orientation of the inserts 42 is obtained by a set of retaining projections 413 formed on the internal surface of the cylindrical body which are inserted into the outer openings 421 leaning against end surfaces 4211 thereof thus blocking a rotation of inserts 42. In the presented embodiment, the inserts 42a, 42b are rotated in relation to each other by an angle of 40° so that the angular positions of the outer/inner openings 421, 422 of one of the inserts 42 match the same angular positions of the inner/outer openings 422, 421 of the remaining insert 42.

Figure 4:
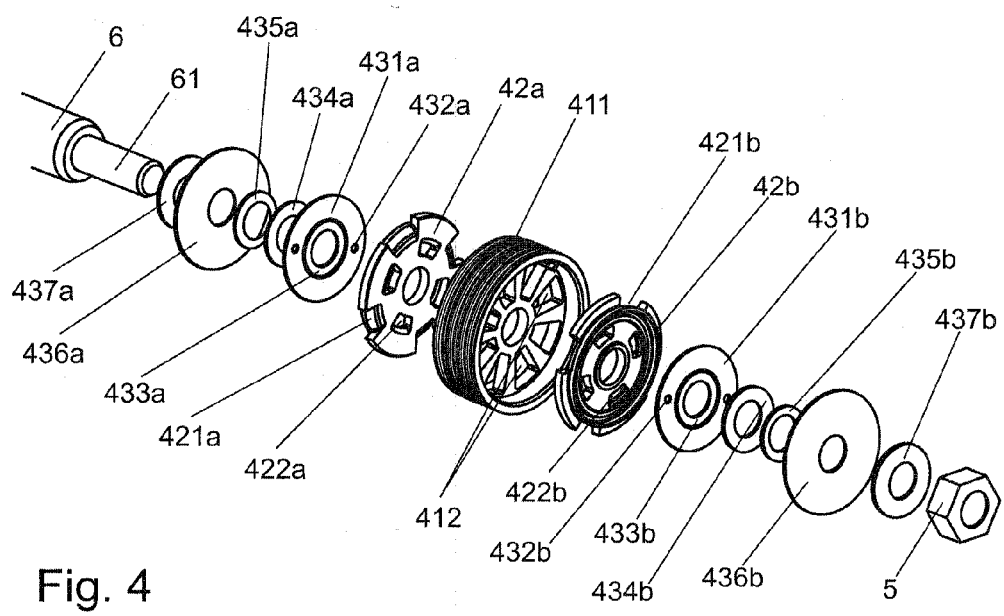
FIG. 4 is an exploded perspective view of the piston assembly shown in FIG. 2.
Figure 5:
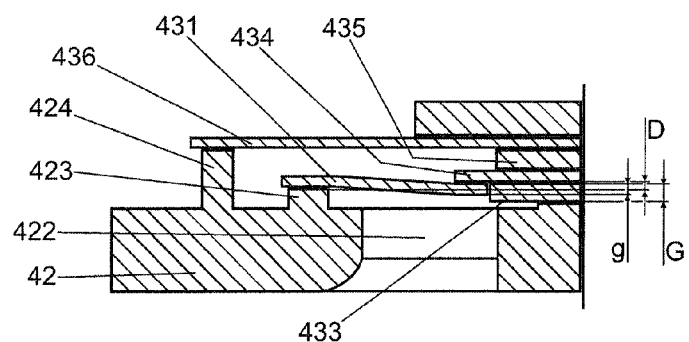
FIG. 5 is an enlarged view of a valve assembly of the piston assembly shown in FIG. 2.

As shown on FIG. 4 and FIG. 5 each valve assembly 43 comprises a floating disc 431 disposed around a centering ring 433 and provided with two orifices 432. The floating disc 431 is retained between a floating disc projection 423 of the insert 42 and a resisting ring 434 fixed between the centering ring 433 and a retaining ring 435 separating the resisting ring 434 from the check valve disc 436. As a result the outer edge of the floating disc 431 may be dislocated (deflected from the projection 423) only in the direction opposite to the direction of a possible dislocation (deflection from the resisting ring 434) of the inner edge of the floating disc 431. The floating disc 431 therefore forms a bidirectional valve capable to deflect and permit working liquid to flow (also through orifices 432) both during a compression stroke and a rebound stroke of the damper 2. To exclude this possibility a check valve disc 436, additionally stiffened by a retaining ring 437 and acting as a one way valve, is provided in series relative to the floating disc 431 valve.

As shown in FIG. 5, the inner resisting surface of the resisting ring 434 is located closer to the cylindrical body 41 than the outer resisting surface of the projection 423. Owing to this both inner and outer edges of the floating disc 431 press on their resisting surfaces with predetermined forces. Therefore, the appropriate adjustment of the floating disc 431 valve is set by choosing an appropriate distance D between the resisting surface of the projection 423 and the resisting surface of the resisting ring 434. Furthermore, a thickness G of the centering ring 433 is larger than a thickness g of the floating disc 431 in order to provide appropriate centering the floating disc 431 also when the outer edge of the floating disc 431 is deflected from the projection 423 causing also a corresponding slight deflection of the internal edge of the floating disc 431 in the opposite direction.

Figure 6:
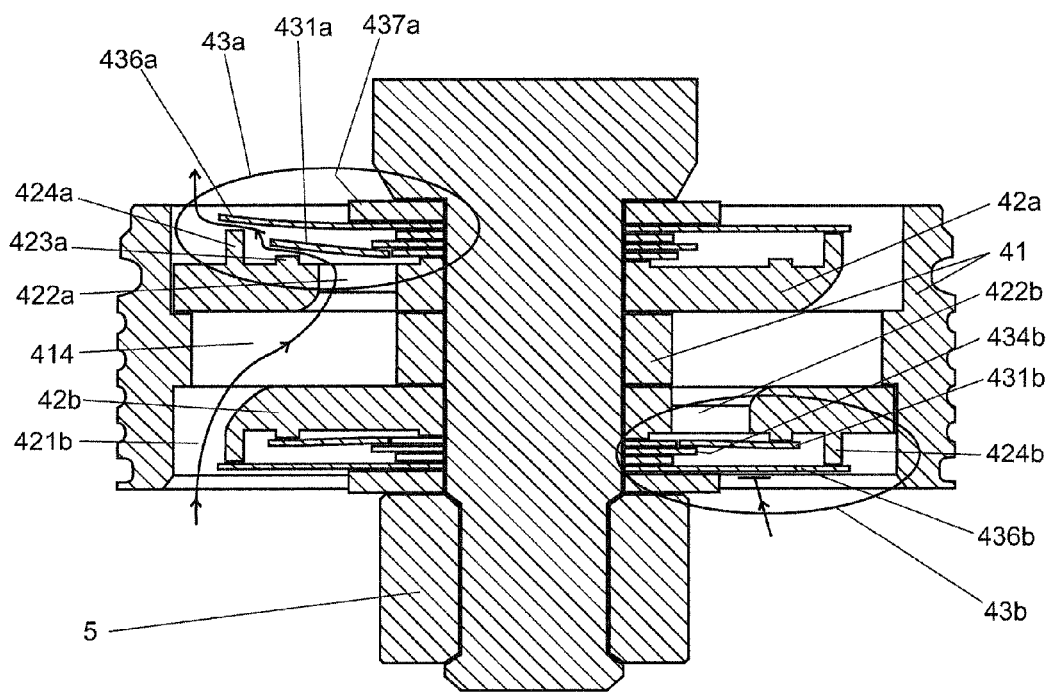
FIG. 6 is a cross-sectional view illustrating behaviour of the piston assembly shown in FIG. 2 during a compression stroke of the damper.

As presented in FIG. 6, only the outer edge of the floating disc 431a of the valve assembly 43a may be deflected from the floating disc projection 423a by overpressure existing in the compression chamber and only with an opening of the check valve disc 436a. In the valve assembly 43b on the other hand, an excess of an overpressure existing in the compression chamber and acting on the floating disc 431b is blocked by the check valve disc 436b with the internal edge fixed on the piston rod and the external edge pressed by an overpressure to the projection 424b. Thus, the internal edge of the floating disc 431b may not be deflected from the resisting ring 434b and consequently both the floating valve and the check valve of the valve assembly 43b are not opened by an overpressure in the compression chamber.

The overpressure activation threshold of the check valve disc 436a is determined by the stiffness of the disc, its diameter, a diameter of the check valve disc projection 424a and a diameter of the retaining ring 437a.

The overpressure activation threshold of the floating disc 431a depends on its stiffness and geometrical dimensions and on the preload of a hogging moment resulting from arranging the disc between the inner resisting surface of the resisting ring 434a faced toward the cylindrical body 41 and the outer resisting surface of the floating disc projection 423a faced out of the body 41 as discussed with reference to FIG. 5.

In the inversed pressure conditions during a rebound stroke of the damper, i.e. at an overpressure existing in the rebound chamber, conversely, the bottom valve assembly 43b is in operation whereas the upper valve assembly 43a remains closed.

Figure 7:
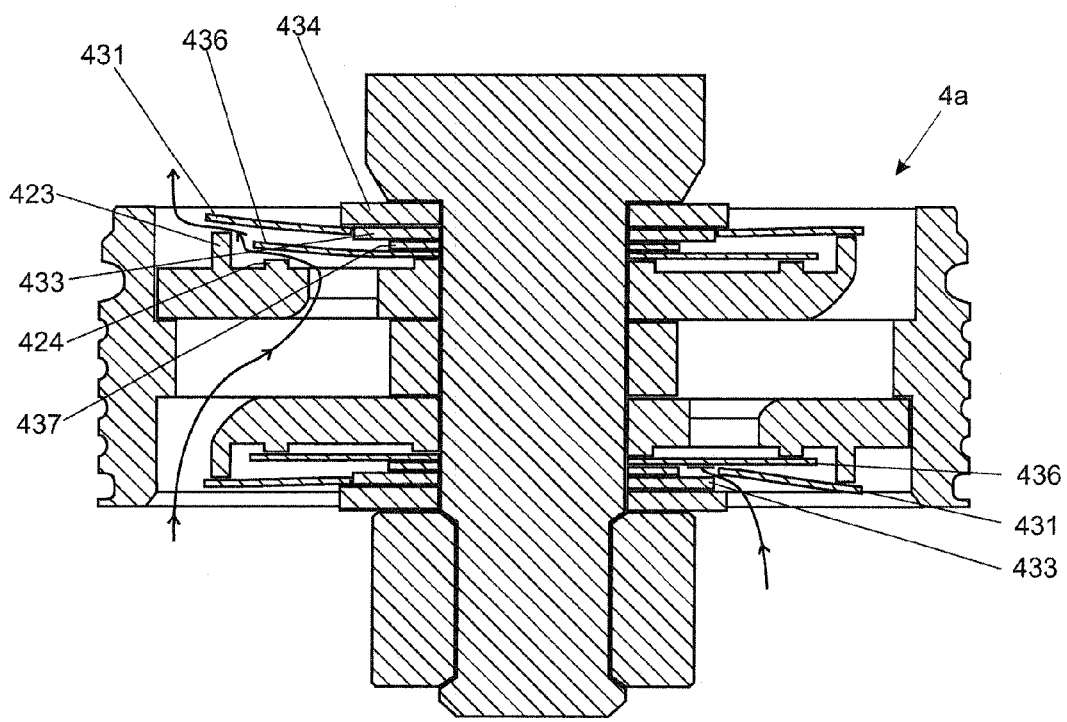
FIG. 7 is a schematic cross-sectional view of another embodiment of a piston assembly of the damper according to the present invention.

FIG. 7 presents another embodiment of a piston assembly 4a according to the present invention constituting the assembly 4 from FIG. 2 having valve assemblies with a mutual change of locations of the floating disc 431 with the centering and resisting rings 433, 434 and the check valve disc 436 with the retaining ring 437. In this embodiment, the check valve disc projection 424 is lower than the floating disc projection 423 surrounding the projection 424. As in this embodiment the check valve disc 436 and the floating disc 431 are also arranged in series in relation with each other thus an operation of the serial valve assemblies 43 of the piston assembly 4a is substantially the same as an operation of the valve assemblies of the piston assembly from FIG. 2 wherein in the blocking state of the valve assembly 43 the check valve disc 436 blocks the flow of the working fluid but not blocks an excess of the overpressure to the floating disc 431 the internal edge of which is therefore deflected from the resisting ring 434.

The above embodiments of the present invention are merely exemplary. The figures are not necessarily to scale, and some features may be exaggerated or minimized. These and other factors however should not be considered as limiting the spirit of the invention, the intended scope of protection of which is indicated in appended claims.

What is claimed is:

1. A hydraulic damper, in particular a motor vehicle suspension damper, comprising:
   a tube filled with working liquid, inside of which a slidable piston assembly attached to a piston rod led outside the damper along an axis and through a piston rod guide and provided with at least one valve assembly to control the flow of working liquid passing through the piston assembly during rebound and compression stroke of the damper, is disposed dividing the tube into a compression chamber and a rebound chamber, wherein the piston rod passes through the piston assembly and a fastener secures the piston assembly at the other side,
   said piston assembly including a body (41) and at least one insert (42) fixedly positioned within said body (41),
   said at least one insert (42) defining an inner opening (422) extending axially therethrough for allowing the working fluid to pass through the at least one insert (42) during the rebound or compression stroke of the piston assembly,
   said at least one insert (42) including a first projection (423) and a second projection (424) each disposed radially outwardly of said inner opening (422),
   said at least one valve assembly (43) including a floating disc valve (431) biased in overlaying relationship with said first projection (423) of said at least one insert (42), and
   said at least one valve assembly (43) additionally including a unidirectional check valve disc (436) disposed serially with said floating disc valve (431) and biased in overlaying relationship with said second projection (424) of said at least one insert (42) for isolating said floating valve disc (431) from the flow of working liquid during compression or rebound stroke of the damper (2).

2. The hydraulic damper according to claim 1, wherein said at least one valve assembly (43) includes a compression valve assembly (43*a*) and a rebound valve assembly (43*b*) each including unidirectional check valve discs (436*a*, 436*b*) disposed serially with floating disc valves (431*a*, 431*b*) and biased in overlaying relationship with respective second projections (424*a*, 424*b*) for isolating said floating valve discs (431*a*, 431*b*) from the flow of working liquid respectively during compression and rebound stroke of the damper (2).

3. The hydraulic damper according to claim 2, wherein the piston assembly (4) forms a symmetrical cross-flow arrangement.

4. The hydraulic damper according to claim 3, wherein said body (41) is provided with at least two channels (414) separated by bridges (415), and said at least one insert (42) includes two inserts (42*a*, 42*b*) each provided with at least one inner opening (422) and at least one outer opening (421) and each of said inserts (42*a*, 42*b*) are fixedly positioned angularly within said body (41) in relation to one another and to the channels (414) so that each inner opening (422*a*) of insert (42*a*) cooperates with a channel (414) and one outer opening (421*b*) of insert (42*b*) at the other side of the body (41).

5. The hydraulic damper according to claim 2, wherein said first and second projections (422, 423) of said at least one insert (42) define valve seats for the rebound and compression valve assemblies (43).

6. The hydraulic damper according to claim 2 wherein said compression (43*a*) and rebound (43*b*) valve assemblies of the piston assembly (4) have the same constructions.

* * * * *